Jan. 18, 1944.                D. R. EMANUEL                2,339,469
                         AUTOMATIC REGULATING DEVICE
                             Filed Aug. 5, 1942

INVENTOR.
D. R. EMANUEL
BY McCauley & McCauley
ATTORNEYS.

Patented Jan. 18, 1944

2,339,469

UNITED STATES PATENT OFFICE 2,339,469

AUTOMATIC REGULATING DEVICE

Dallas R. Emanuel, Tulsa, Okla., assignor to Mid-Continent Petroleum Corporation, Tulsa, Okla., a corporation of Delaware Application August 5, 1942, Serial No. 453,625

6 Claims. (Cl. 137—153)

This invention relates to automatic regulating devices of the type wherein compressed air, or other fluid under pressure, is employed in the automatic control or regulation of temperatures, pressures, liquid levels, etc. Automatic regulators of this kind are employed to regulate the delivery of fuel to burners, so as to maintain predetermined temperatures, also to maintain constant pressures in various kinds of systems, and to maintain predetermined liquid levels in tanks, and the like. Other kinds of equipment may be regulated or controlled by such devices. In oil refineries they are employed to maintain predetermined liquid levels in oil-refining equipment, and also to regulate the delivery of fuel to the burners of oil stills, thereby maintaining predetermined temperatures in the stills.

Most of these automatic regulating devices depend upon a source of compressed air in the automatic regulation, the air pressure being employed to operate valves or other regulating instruments. Consequently, the use of such pressure-controlled devices is subject to hazards and economic losses which occur when there is an unexpected failure in the supply of compressed air. For example, assume that an oil still is operating under extremely high temperature conditions resulting in very high vapor pressures in the still, an unexpected failure of the usual automatic regulator may result in hazardous changes in the pressure and temperature conditions. Such failure would occur when the normal supply of compressed air is unexpectedly reduced or eliminated, and it may be due to a broken air pipe, or a failure of the air compressor to maintain the required pressure.

Aside from these hazards, economic losses occur when the automatic air-controlled regulators fail to perform their expected functions. An abnormal reduction in the air pressure will usually cause the automatic regulator to move to one of its extreme positions, thereby producing an extreme temperature, pressure, or other condition quite objectionable in the regulated equipment.

Therefore, an object of the present invention is to avoid the extreme conditions which usually occur when there is an unexpected failure of the compressed air, or other fluid under pressure, or when the supply of compressed air is deliberately discontinued in making repairs, or the like.

In actual practice, the normal pressure conditions usually adjust a valve, or other regulating member, to selected intermediate positions, remote from its extreme positions, so the regulating member is normally located in one of the automatically selected intermediate positions. A specific object of the present invention is to produce a stopping device, or locking device, which locks the automatic regulator in selected intermediate positions in response to an abnormal low pressure in the supply of compressed air, or other fluid pressure. More specifically stated, in a desirable form of the invention, when the air pressure drops to a predetermined degree, the new device will immediately lock the automatic regulator in its previously selected intermediate position, thereby preventing the regulator from moving to an extreme position in response to the unexpected low pressure. In other words, when there is a sudden failure of the air pressure, the usual automatic control is superseded by a stop device, or locking device, which locks the automatic regulator in a previously selected intermediate or normal position, so as to avoid the usual hazards and losses resulting from abnormally low pressures.

A further object of the invention is to produce an entirely feasible safety device of this kind, which does not interfere with the normal operations of the automatic regulator, and which performs its locking function before the controlling pressure becomes low enough to cause a false adjustment of the automatic regulator. The new device is preferably arranged to lock the automatic regulator in response to a predetermined low pressure, but at a time when the decreasing pressure is still high enough to properly locate the regulator in a selected intermediate position. The automatic regulator is thus retained in a properly selected position, regardless of further decreases in the pressure.

Another object of the invention is to automatically unlock the regulator when the normal pressure conditions are restored. This feature enables the automatic regulator to perform its expected functions whenever the required pressure is present, and eliminates the necessity of precautions or special attention to the locking device in starting the automatic regulating system.

With the foregoing and other objects in view, the invention comprises the novel construction, combination and arrangement of details hereinafter more fully described and illustrated in the accompanying drawing. However, it is to be understood that the scope of the patent extends to variations and modifications within the scope of terms employed in the claims hereunto appended.

It is to be understood that the invention is directed to a safety device which may be used with conventional systems now employed to regulate temperatures, pressures, liquid levels, etc. Most of these systems are quite complex, involving the use of many details such as thermostats for heat-regulation, pressure devices for pressure-regulation, float-controlled devices for maintaining liquid levels. However, since such systems are old and well understood in the art, I do not deem it necessary to show all of the details of any one system, and to simplify the description I have diagrammatically shown a few details of float-controlled devices which may be employed to maintain an approximately constant liquid level.

However, in each of these conventional systems there is an automatically-controlled regulator, usually in the form of a valve to be automatically adjusted in response to controlled variations in the pressure of air or other fluid. I will herein refer to compressed air with the understanding that other gaseous or liquid fluids may be employed instead of air.

Figure 1:
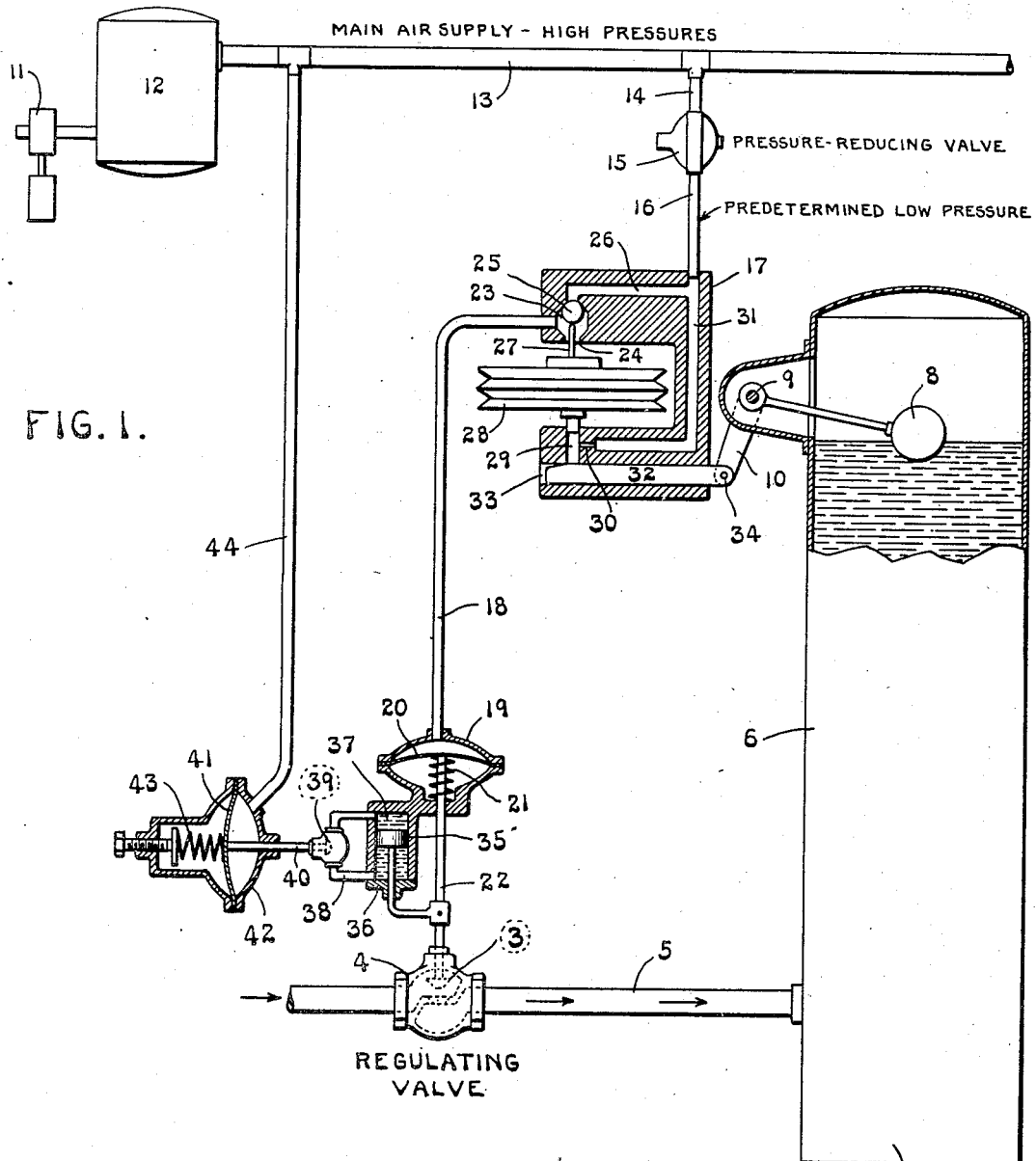
Fig. 1 is a diagrammatical view of an automatic regulating system embodying features of this invention.

In Fig. 1 of the drawing, the automatically-controlled regulator is in the form of a valve 3 located in a housing 4 to regulate the flow of liquid through a pipe 5 leading to a chamber 6. Liquid may be discharged from the chamber 6 through a pipe 7. The regulating valve 3 can be adjusted to maintain an approximately constant liquid level in the chamber 6. A float 8, in the upper portion of said chamber, is fixed to a shaft 9 provided with an operating arm 10. Movements of the float are transmitted to the arm 10 and employed in any suitable manner to regulate air pressure which controls the regulating valve 3, as will be hereafter described.

The source of air pressure may include an air compressor 11 discharging compressed air into a reservoir 12 provided with a main air-supply pipe 13, which may be employed to deliver the compressed air to numerous automatic regulating systems. This source of compressed air may be under varying degrees of high pressure. For example, I will assume that this varying high pressure is about 50 pounds per square inch, more or less, and that a predetermined pressure of 20 pounds is desired for operation of the automatic regulator.

A branch pipe 14 leading from the pipe 13 is equipped with a pressure-reducing valve 15 which maintains the predetermined pressure of 20 pounds in a pipe 16 leading to control devices in a housing 17, to be hereafter described. The controlled air pressure may be transmitted through a pipe 18 leading to a housing 19 containing a diaphragm 20, so as to act upon the top of said diaphragm. A spring 21 tends to impart an upward movement to the diaphragm. The regulating valve 3 is provided with a stem 22 connected to said diaphragm 20.

Consequently, the regulating valve 3 may be opened in response to the pressure of the spring 21, or closed in response to a higher air pressure from the pipe 18. In actual practice, the air pressure in pipe 18 may be regulated to maintain the valve 3 in intermediate positions, which provide for an approximately constant flow of liquid through pipe 5, and an approximately constant discharge through the pipe 7.

Fig. 1 shows the float 8 in an abnormally low position, so the regulating valve 3 is wide open to provide the maximum flow of liquid through the inlet pipe 5. Under these conditions, the spring 21 forces the valve 3 to its extreme open position, while the air at the upper portion of diaphragm 20 is free to pass through the pipe 18 to a valve chamber 23, where it escapes to the atmosphere through an exhaust port 24. A ball valve 25 then closes an air passageway 26 above the chamber 23. At this time, the valve 25 is forced upwardly through the medium of a stem 27 extending from a bellows 28 which receives air pressure from a vertical passageway 29. Said passageway 29 communicates with a restricted orifice 30 at the lower terminal of an elongated passageway 31, leading from the air supply pipe 16, and communicating with the upper passageway 26.

When the parts are located in the extreme positions shown in Fig. 1, the lower end of passageway 29 is entirely closed by a valve 32 slidable in a passageway 33, said valve 32 being loosely pivoted at the float-controlled arm 10. Therefore, the entire pressure of 20 pounds per square inch is then transmitted through passageways 31 and 29 to the large area of bellows 28, which transmits a relatively severe upward pressure to the ball valve 25, so as to close the air passageway 26. This extreme condition prevents the transmission of air pressure to the pipe 18 and diaphragm 20, so the spring 21 retains the automatic regulating valve 3 in its extreme open position.

Another extreme condition would occur if the float 8 were permitted to rise to an extremely high abnormal position. The slidable valve 32 would then be moved to the right so as to completely open the bottom of air passageway 29. In this event, air discharged from the restricted orifice 30 would freely escape through the passageway 33, so as to relieve the pressure in the bellows 28, and allow the ball valve 25 to close the exhaust port 24 at the bottom of the valve chamber 23. Air pressure from pipe 16 would then be effectively transmitted through passageway 26, valve chamber 23 and pipe 18 to the diaphragm 20, so as to overcome the pressure of the spring 21 and entirely close the regulating valve 3.

However, a regulating device of this kind is usually designed to provide for an approximately constant discharge of liquid through the discharge pipe 7 and an approximately constant admission of liquid through the supply pipe 5, the float 8 being normally located between its extreme positions, so as to normally locate the regulating valve 3 in one of its intermediate positions. Fig. 1 is merely a simplified diagrammatical illustration of the device, but it is to be understood that a complete automatic control device is usually designed to provide for varying degrees of air pressure in the pipe 18, and a normal operating condition usually provides for an approximately constant or uniform rate of flow through the supply pipe 5 in response to an automatically selected degree of relatively low pressure in the pipe 18. In the specific example, the maximum air pressure in the pipe 16 would be the predetermined 20 pounds derived from the pressure-reducing valve 15, but various lower pressures are obtainable by adjustments of the slidable valve 32 which controls the discharge or bleeding of this air to the atmosphere.

Of course, there is more or less chattering, or vibration in the float-controlled devices, and the regulating valve 3 may ocupy different intermediate positions, but said regulating valve 3 is normally open to an extent required for a normal flow of oil or other liquid in the supply pipe 5.

All of the expected automatic regulating conditions may be obtained as long as a relatively high pressure is transmitted to the pressure-reducing valve 15. However, when this supply of air under relatively high pressure is discontinued, or when the pressure is reduced to a degree below 20 pounds, the usual automatic regulator will fail to perform its expected functions. For example, if the air pressure is entirely eliminated, the spring 21 of the usual regulating system would move the regulating valve 3 to an extreme open position, thereby unexpectedly allowing an excess supply of oil or other liquid to rush through the supply pipe 5.

Failures of this kind are unusual and unexpected, so they are likely to result in losses at the automatically controlled equipment, as well as fire hazards in the control of oil, and particularly where the regulated oil supply is intended for oil burners, such as the burners for heating high pressure oil stills, or the like.

To illustrate a suitable means for reducing, or eliminating such losses and hazards, I have shown a stopping device which locks the automatic regulator 3 in response to a predetermined low pressure in the main air supply pipe 13. The specific form of the invention shown in Fig. 1 comprises a piston 35 connected to and movable with the stem 22 of the automatic regulating valve 3. This piston is normally free to reciprocate in a cylinder 36 containing oil 37, or other suitable liquid. A liquid-conductor 38 communicates with the ends of said cylinder 36 to permit displacement of the liquid in response to movements of the piston. A stop valve 39 is located in the conductor 38, but this valve is normally open to permit movement of the piston 35 with the valve stem 22.

Consequently, the piston 35 does not impair the normal action of the automatically controlled regulating valve. On the contrary, the piston and cylinder incidentally serve as a cushion or shock absorber, tending to reduce the objectionable chattering or vibration which usually occurs in automatic instruments of this kind.

The stop valve 39 is provided with a stem 40 connected to a yieldable operating member, which may be in the form of a diaphragm 41 located in a housing 42. A spring 43, at one side of this diaphragm, tends to force the stop valve 39 to its closed position. However, the opposite side of said diaphragm communicates with a pipe 44 connected to the main air supply pipe 13, so the diaphragm 41 is normally subjected to the relatively high air pressure which overcomes the force of the operating spring 43, thereby normally retaining the stop valve 39 in its open position.

The spring 43 is carefully selected or adjusted to close the stop valve 39 in response to a predetermined low degree of air pressure on the opposite side of the diaphragm. For example, if the high pressure derived from the main air pipe 13 is reduced to 20 pounds at the reducing valve 15, the spring 43 may be set to close the stop valve 39 when the high pressure in the main line 13 drops to 25 pounds.

In this event, the regulating valve 3 will be automatically adjusted in response to the predetermined reduced pressure of 20 pounds, so long as the high pressure in the main air line exceeds 25 pounds. However, when this high pressure drops to 25 pounds, the spring 43 will force the stop valve 39 to its closed position, thereby preventing displacement of the piston 35 which is connected to the valve stem 22. The automatic regulating valve 3 is thus locked in a fixed position in response to the decreasing air pressure.

This locking of the automatic regulator 3 preferably occurs while the decreasing air pressure is still high enough to provide the predetermined control pressure of 20 pounds in the pipe 16. Consequently, the regulating valve 3 is locked in a properly selected operating position before there is a failure of the automatic regulating system. Continued reduction in the air pressure may entirely eliminate the effective air pressure above the diaphragm 20, and the spring 21 may tend to force the regulating valve 3 to its extreme open position, but such movement is prevented by the closed stop valve 39 which positively prevents displacement of the piston 35.

Therefore, instead of being forced to an extreme abnormal position, the regulating valve 3 is held in the previously selected operating position until the pressure in the main air line 13 is high enough to insure the desired automatic regulation. In the specific example, a predetermined control pressure of 20 pounds is selected at the pressure-reducing valve 15, so the automatic regulating valve 3 may be safely unlocked when the pressure in the main air line 13 exceeds 25 pounds. When such air pressure is restored, it will be transmitted through the branch pipe 44 to the diaphragm 41 so as to overcome the pressure of the spring 43, thereby opening the stop valve 39 to release the automatic regulating valve 3. The automatic regulator is thus unlocked and again placed in service whenever the air pressure is restored, and this unlocking operation does not require any work or personal attention of the operator.

Figure 2:
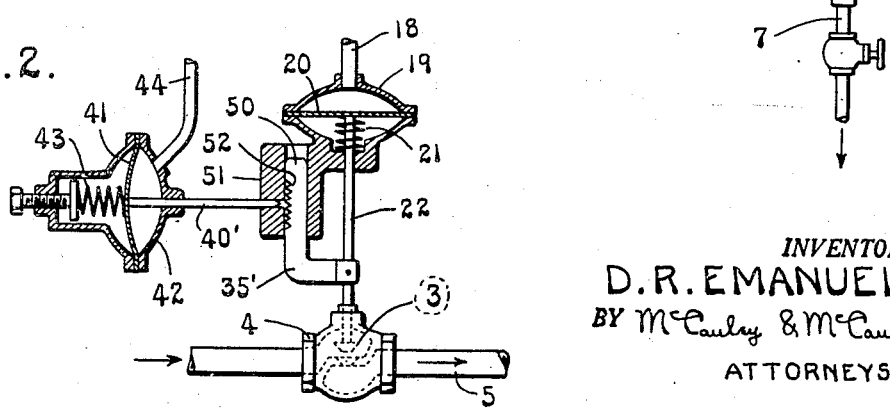
Fig. 2 is a side view, partly in section, illustrating another form of the invention.

Fig. 2 illustrates a form of the locking device including a stop member 35' connected to and movable with the valve stem 22, said stop member having an extension 50 arranged parallel with the stem 22 and slidably mounted in a guide 51. This extension 50 may be provided with a series of teeth, or abutments 52 adapted to receive a stop member 40' secured to the diaphragm 41. The stop member 40' is slidable in the guide 51 and it lies at a right angle to the toothed member 50.

In view of the previous description it will be readily understood that the normal high air pressures on the diaphragm 41 will retain the stop member 40' (Fig. 2) in an idle position beyond the path of the toothed member 50. However, in response to a predetermined low pressure in the pipe 44, the spring 43 will force the stop member 40' into interlocking engagement with the toothed member 50, thereby locking the regulating valve 3. When the air pressure is restored, it will act upon the diaphragm 41 to restore the stop member to the idle position shown in Fig. 3, thereby unlocking the regulating valve 3.

Devices of the type shown in Fig. 2 can be successfully employed, although they lack the shock-absorbing advantages of the piston 35 and cylinder 36 in Fig. 1.

I claim:

1. In an automatic regulating device provided with a source of relatively high air pressure, a pressure-reducing valve to provide for predetermined reduced operating pressures, and an automatic regulating valve movable in response to controlled variations in the reduced operating pressures, the improvement which comprises a stopping device to lock said automatic regulating valve in selected intermediate positions in response to abnormally low air pressures, said stopping device including a pressure-responsive operating member communicating with said source of relatively high air pressure, so as to permit operation of said automatic valve in response to the relatively high normal pressures, said operating member being movable to lock said regulating valve in response to an abnormal reduction in the relatively high air pressure.

2. In an automatic regulating device provided with a source of fluid pressure and an automatic regulator movable in response to controlled variations in the fluid pressure, the improvement which comprises a stopping device to stop said automatic regulator in selected intermediate positions in response to abnormally low fluid pressures, said stopping device including a piston connected to and movable with said automatic regulator, a cylinder in which the piston reciprocates, a liquid conductor communicating with the ends of said cylinder to permit displacement of liquid in response to movements of the piston, a stop valve located in said liquid conductor and movable to prevent said displacement of liquid, thereby retaining the piston and automatic regulator in selected positions, a yieldable operating member tending to force said stop valve to its closed position, and fluid conductors through which fluid pressure is transmitted from said source to said yieldable operating member so as to normally retain said stop valve in an open position.

3. In an automatic regulating device provided with a source of fluid pressure, a pressure-reducing valve to provide for predetermined reduced operating pressures, and an automatic regulating valve movable in response to controlled variations in the reduced operating pressures, the improvement which comprises a stopping device to stop said automatic regulating valve in selected intermediate positions in response to abnormally low fluid pressures, said stopping device including a piston connected to and movable with said automatic regulating valve, a cylinder in which the piston reciprocates, a liquid conductor communicating with the ends of said cylinder to permit displacement of liquid in response to movements of the piston, a stop valve located in said liquid conductor and movable to prevent said displacement of liquid, thereby retaining the piston and automatic regulating valve in selected positions, a diaphragm connected to said stop valve, a spring at one side of said diaphragm tending to force said stop valve to its closed position, and fluid conductors through which relatively high pressure is transmitted from said source to the opposite side of said diaphragm so as to normally retain said stop valve in an open position.

4. In an automatic regulating device provided with a source of fluid pressure and an automatic regulating valve movable in response to controlled variations in the fluid pressure, a locking device to lock said regulating valve in selected open positions in response to abnormally low fluid pressures, said locking device including a stop member adapted to occupy a normal position wherein it permits regulation of said automatic regulating valve in response to the controlled fluid pressure, said stop member being movable to an abnormal position wherein it locks said regulating valve in the selected open positions, and a pressure-responsive operating member communicating with the source of fluid pressure to retain the stop member in said normal position, said operating member and stop member being movable to positively lock said regulating valve in a fixed open position in response to an abnormal reduction in said fluid pressure.

5. In an automatic regulating device having a source of relatively high fluid pressure, a pressure-reducing valve to provide for a predetermined reduced operating pressure, and an automatic regulating valve movable in response to controlled variations in the reduced operating pressure, a locking device to lock said regulating valve in selected open positions in response to abnormally low fluid pressures, said locking device including a stop member movable to positively lock said automatic regulating valve, a diaphragm operatively connected to said stop member, a spring at one side of said diaphragm tending to force said stop member to its locking position, and a fluid conductor through which fluid under pressure is transmitted from said source of relatively high pressure to the opposite side of said diaphragm, so as to normally overcome the force of said spring, the said spring being adjusted to shift said diaphragm and stop member to their locking positions while the fluid pressure at the diaphragm is higher than said reduced operating pressure.

6. An automatic regulating device according to claim 4, wherein the regulating valve is provided with a stop member movable in response to movements of said valve, and adapted to interlock with the first mentioned stop member, so as to lock said regulating valve in said fixed open position.

DALLAS R. EMANUEL.